United States Patent
Rogers, Jr. et al.

(10) Patent No.: US 6,550,839 B2
(45) Date of Patent: Apr. 22, 2003

(54) VEHICLE PIVOTING CLOSURE POWER OPERATING ASSEMBLY

(75) Inventors: Lloyd Walker Rogers, Jr., Shelby Township, MI (US); Ann P McCarthy-Garland, Harper Woods, MI (US); Douglas Dombrowski, Troy, MI (US); Theodore J Lindsay, Shelby Township, MI (US); Ian Martin, Waterford, MI (US); Howard Warren Kuhlman, Rochester Hills, MI (US); Michael Antonio Ciavaglia, Dearborn, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/849,779

(22) Filed: May 4, 2001

(65) Prior Publication Data

US 2002/0005650 A1 Jan. 17, 2002

Related U.S. Application Data

(60) Provisional application No. 60/203,210, filed on May 11, 2000, and provisional application No. 60/231,860, filed on Sep. 12, 2000.

(51) Int. Cl.[7] .............................................. B62D 33/27
(52) U.S. Cl. ..................... 296/56; 296/146.8; 49/340
(58) Field of Search ......................... 296/56, 76, 146.4, 296/146.11, 146.12, 223, 106, 146.8; 49/339–344

(56) References Cited

U.S. PATENT DOCUMENTS

| | | | | |
|---|---|---|---|---|
| 3,343,303 A | * | 9/1967 | Wanlass | 49/280 |
| 3,713,472 A | * | 1/1973 | Dozois | 296/56 |
| 4,568,237 A | * | 2/1986 | Krause et al. | 296/56 |
| 5,143,496 A | * | 9/1992 | Smith et al. | 296/56 |
| 5,788,312 A | * | 8/1998 | Lee | 296/76 |
| 6,055,776 A | | 5/2000 | Dettling et al. | |
| 6,092,336 A | | 7/2000 | Wright et al. | |
| 6,092,337 A | | 7/2000 | Johnson et al. | |
| 6,283,535 B1 | * | 9/2001 | Yuge | 296/146.8 |
| 6,341,809 B1 | * | 1/2002 | Chapman | 296/56 |
| 6,367,199 B2 | * | 4/2002 | Sedlak et al. | 296/56 |
| 6,454,339 B2 | * | 9/2002 | Wilde et al. | 296/76 |

FOREIGN PATENT DOCUMENTS

WO    WO 01/83924 A1    11/2001

* cited by examiner

Primary Examiner—Stephen T. Gordon
Assistant Examiner—G Blankenship
(74) Attorney, Agent, or Firm—Kathryn A. Marra

(57) ABSTRACT

A vehicle pivoting closure assembly has a concealed power actuator remotely operated by a controller to open and close a closure or liftgate. A hinge member of the power actuator is engaged pivotally to a vehicle structure about a hinge axis, and rigidly to the closure. An armature extends pivotally from an elongated linear moving rack about a rack pivot axis and to the hinge member. The armature also pivotally engages the hinge member about a secondary pivot axis disposed parallel to the hinge axis and rack pivot axis. The rack is driven by a pinion gear train powered by a motor through a clutch. The hinge, the rack, the gear train and the motor are all supported by a reinforcement tray forming a modular engaged to the vehicle structure. The tray isolates the extreme dynamic loads placed upon the hinge by the motor, thereby eliminating the need to further reinforce the vehicle structure.

19 Claims, 5 Drawing Sheets

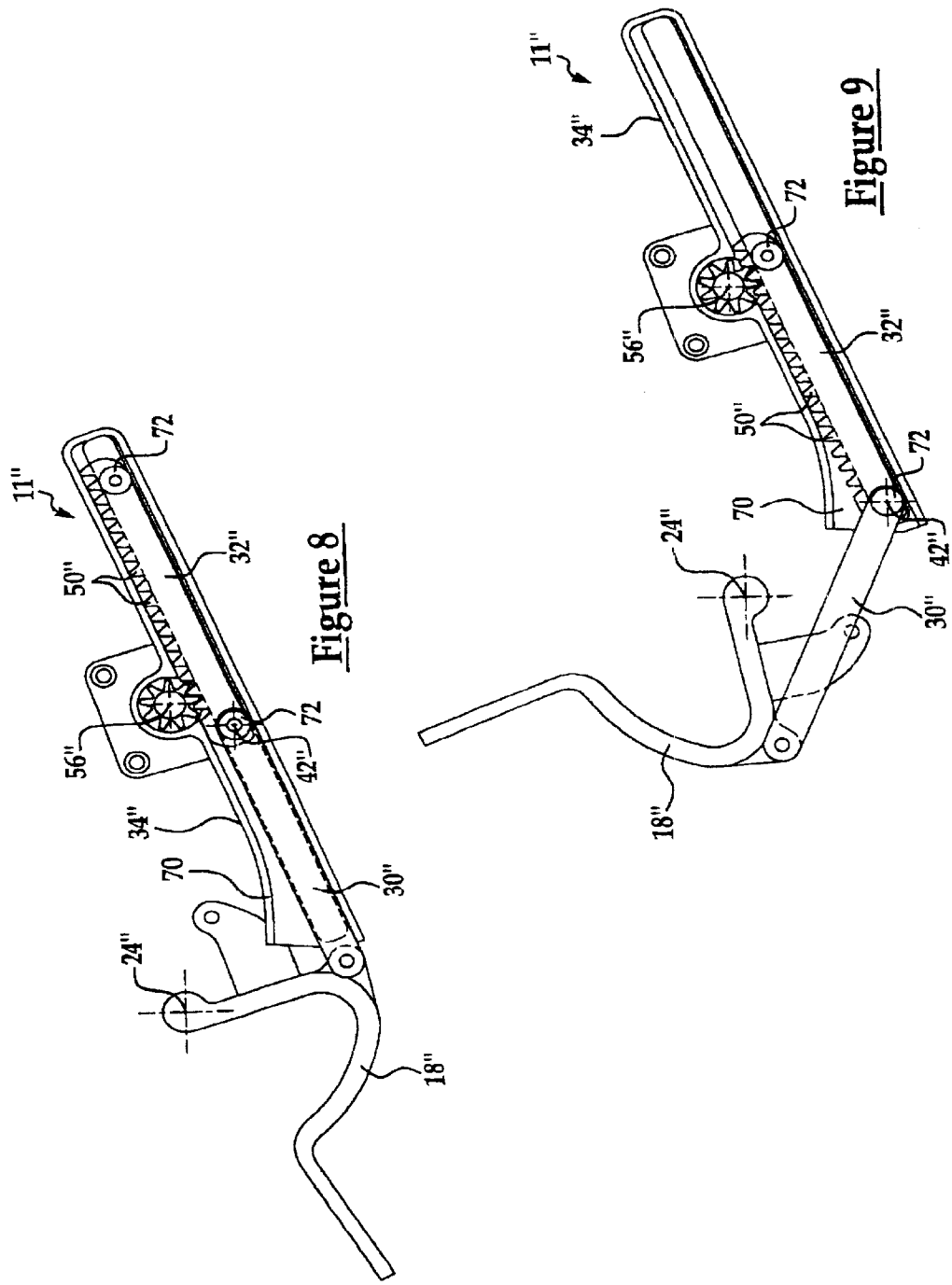

VEHICLE PIVOTING CLOSURE POWER OPERATING ASSEMBLY

REFERENCE TO EARLIER FILING DATES

This application claims the benefit of U.S. Provisional Application No. 60/203,210, filed May 11, 2000, and U.S. Provisional Application No. 60/231,860 filed Sep. 12, 2000.

FIELD OF THE INVENTION

The present invention relates to a vehicle pivoting closure, and more particularly to a remotely actuated vehicle pivoting closure power operating assembly for a liftgate.

BACKGROUND OF THE INVENTION

Pivoting closures, tailgates and more specifically, liftgates, of vehicles, such as mini-vans, sport utility vehicles and the like, are hinged generally along one edge or cut line. The cut line forms the seam between the exterior surface of the closure and the exterior surface of the vehicle body. For liftgates, the closure pivots, at the top along a substantially horizontal hinge axis. The hinge axis may be disposed interiorly from the cut line or exteriorly from the cut line with respect to the vehicle. If the cut line is interior or inside of the cut line, a "goose-neck" hinge is typically used so the closure can clear the vehicle structure when it pivots open and closed.

Liftgates are known to have a horizontal hinge axis disposed interiorly to the cut line utilizing a goose-neck hinge. The liftgate goose-neck hinges are pivotally engaged to the roof of the vehicle or header of the rear opening which is generally supported on either side by a substantially vertical D-pillar. Manually operating the liftgate requires a fair amount of human strength to lift the gate up when opening, or to pull the liftgate down when closing. Gas Struts are commonly used to provide assistance in the lifting of the liftgate, however, they resist the pulling down or closing of the liftgate. Furthermore, when fully open, the liftgate can be hard to reach for users of a short stature.

Electrically powered actuators are known to open and close pivoting closures or liftgates. These actuators vary from hydraulic cylinders to cable assemblies. Placement of the assemblies within the vehicle are limited due to the concentrated forces applied by the mechanisms to the vehicle structure. One means of reducing the concentrated loads is to secure the powered actuators or assemblies to the closure at some considerable distance away from the hinge axis. Pinion gear driven rack assemblies typically engage between the vertical D-pillars of the vehicle and the closure by pivoting rods which push or pull upon the liftgate independent of the liftgate goose-neck hinges and at a considerable distance away from the hinge axis. Consequently, the D-pillar support rack designs visibly protrude into the opening of the cargo bay.

SUMMARY OF THE INVENTION

A vehicle pivoting closure assembly has a power actuator remotely controlled by a controller for opening and closing a closure, preferably a liftgate, over a cargo opening. The closure is pivotally engaged to a vehicle structure by a hinge member about a hinge axis. The hinge member has a first portion which extends from the hinge axis to a secondary pivot axis. A second portion of the hinge member rigidly extends from the first portion near the secondary pivot axis and engages the closure at its distal end. An armature interconnects a linear moving rack to the hinge member by pivotally engaging the hinge member about the secondary pivot axis, and pivotally engaging the rack at an opposite end about a rack pivot axis. The hinge axis, the secondary pivot axis and the rack pivot axis are disposed parallel to one another.

The elongated rack slides transversely with respect to the hinge axis, moving preferably within a housing secured to the vehicle structure. A pinion gear train engages teeth formed on the rack to produce the linear movement. The gear train rotates about a rotational axis preferably disposed perpendicular to the rack pivoting axis. The gear train is preferably powered by an electric motor through a clutch. The power actuator is preferably in modular form having tray which supports the rack housing, the gear train, the motor, and the clutch. The tray also reinforces the pivoting connection of the hinge member, thereby containing the concentrated loads, or dynamic forces, placed upon the hinge member by the motor within the tray, and further distributing the reactive forces produced by the weight of the door through the vehicle structure, or body.

A feature of the invention is the remotely controlled and powered opening and closing of a vehicle closure.

Another feature of the invention is that the power actuator has a low profile and does not intrude upon the interior space or cargo area of the vehicle.

Yet another feature of the invention is the ability to conceal the power actuator for aesthetic advantages.

Still another feature of the invention is that the power actuator is modular in form and has fewer parts and is less complicated than other operating systems.

Still yet another feature of the invention is the isolation or containment of dynamic forces from the vehicle structure during closing and opening of the liftgate, thereby, protecting the vehicle structure from damage at the hinge mounting locations.

These and other objects, features and advantages of the invention will become more apparent from the following description of the preferred embodiments taken in conjunction with the accompanying drawings.

BRIEF DESCRIPTOIN OF THE DRAWINGS

The presently preferred embodiments of the invention are disclosed in the following description and in the accompanying drawings wherein:

FIG. 8 is a side view of a third embodiment of the power actuator in a closed position; and FIG. 9 is the side view of the third embodiment of the power actuator in an open position.

DETAILED DESCRIPTION OF THE PREFERRED EMBODIMENTS

Figure 1:
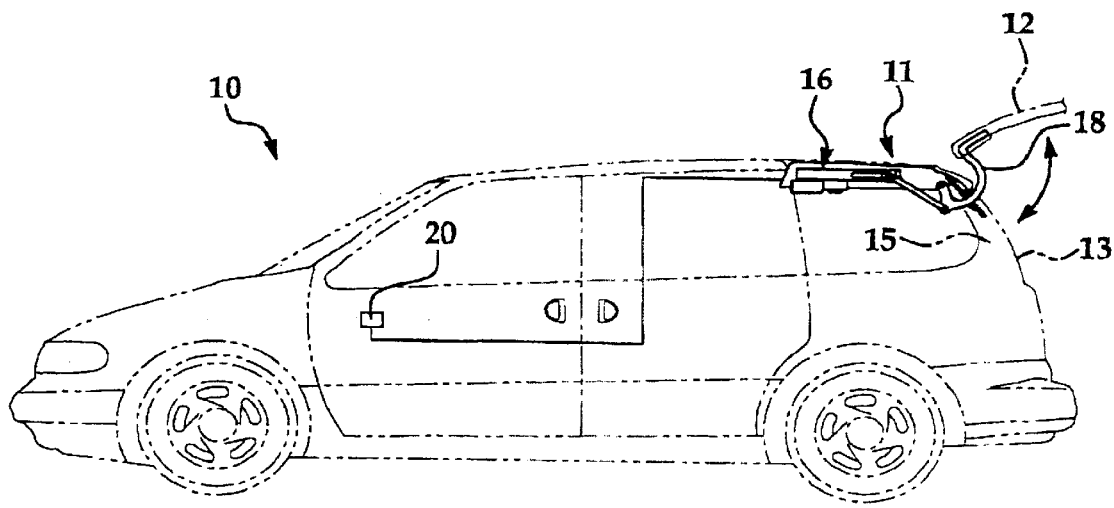
FIG. 1 is a side view of a vehicle having a pivoting closure assembly of the present invention.
Figure 2:
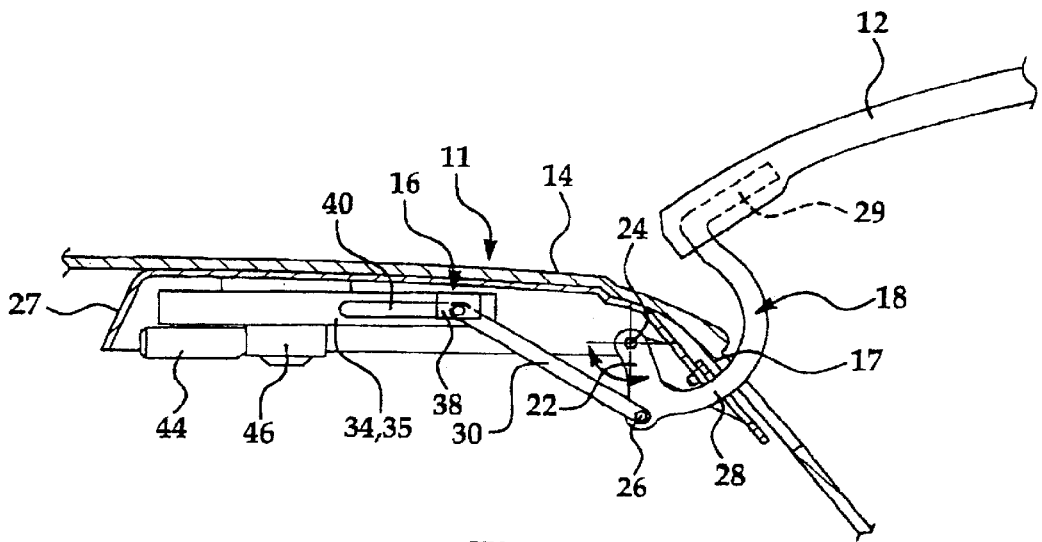
FIG. 2 is an enlarged cross section side view of the pivoting closure assembly in an open position.

Referring in more detail to the drawings, FIGS. 1 and 2 show a vehicle 10 having a pivoting closure assembly 11 in an open position. A closure 12 of the assembly 11 may be any form of door pivoting in any direction, but is preferably a liftgate capable of closing pivotally upon a cargo opening 13. At least one goose-neck hinge member 18 engages rigidly to the closure 12 and pivotally to the header of the opening 13 or vehicle roof 14. The opening 13 is defined, in part, by the header or roof 14 and two roof supporting, substantially vertical, D-pillars 15 located on either end of the header. The hinge members 18 pivot about a common, substantially horizontal, hinge axis 24 disposed interiorly to a seam or cut-line 17 generally defining the perimeter of the opening 13 at the exterior surface of the vehicle 10. Mounted to the vehicle roof 14 is a power actuator 16 of the closure assembly 11 engaged operatively to the closure 12 via the hinge member 18. An electric controller 20 for the power actuator 16 is mounted remotely from the closure 12 and preferably conveniently next to the driver area of the vehicle 10.

Figure 3:
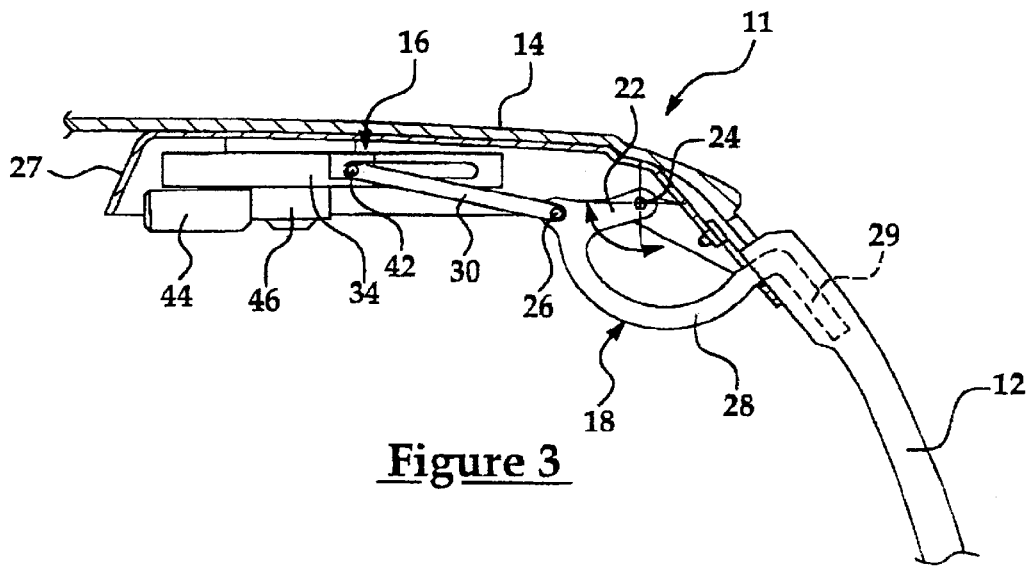
FIG. 3 is an enlarged cross section side view of the pivoting closure assembly in a closed position.
Figure 4:
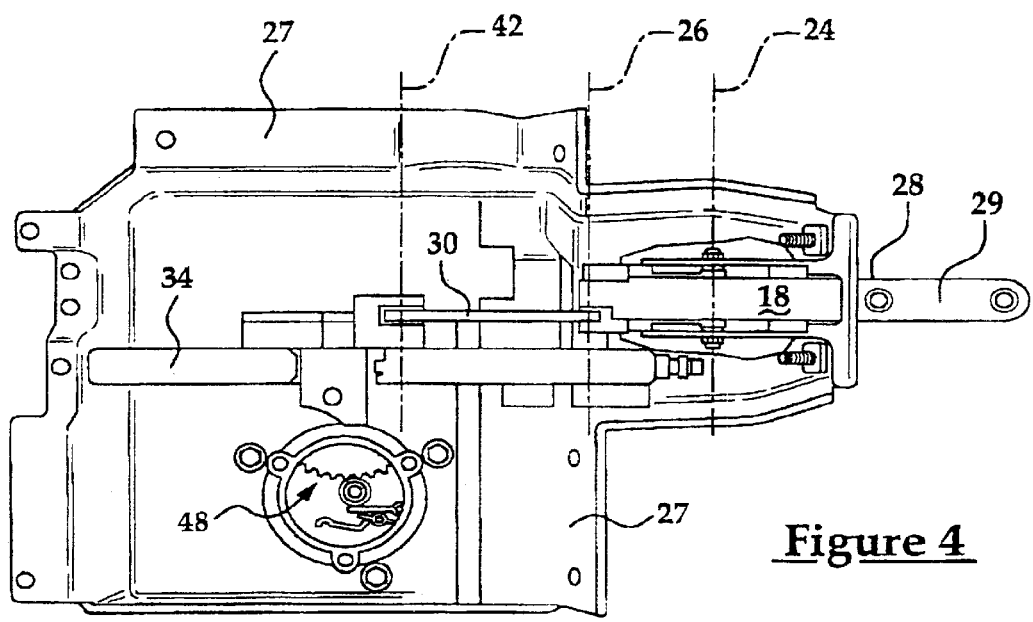
FIG. 4 is a bottom view of a power actuator of the pivoting closure assembly with a motor and a clutch removed to show internal detail.

Referring to FIGS. 2 and 3, the hinge member 18, which is engaged to the power actuator 16, externally resembles a common manual liftgate goose-neck hinge. Aesthetically, there is little to no indication that the liftgate or closure 12 is power actuated at all, or is engaged to the vehicle by anything but a common hinge. The power actuator 16 has a low profile enabling concealment beneath the interior surface or headliner of the vehicle. The hinge member 18 has an elongated first portion 22 concealed within the power actuator 16. The first portion 22 extends from the hinge axis 24 to a secondary pivot pin or axis 26 not found on a common manual hinge. The first portion 22 of the hinge member 18 pivots about the hinge axis 24 which is stationary with respect to the vehicle structure or roof 14. When pivoting, the first portion 22 forms an approximate ninety degree arc at its opposite end substantially near the secondary pivot axis 26. Likewise, the closure 12 pivots within a ninety degree arc with respect to the cargo opening 13. The power actuator 16 includes a tray 27 for pivotally engaging the hinge member 18 at the hinge axis 24, thereby reinforcing the roof 14. The tray 27 provides a means to distribute the otherwise concentrated loads exerted upon the roof 14 by the hinge member 18 as a result of forces exerted by the power acutator 16 directly to the hinge member 18. Most liftgates can be operated with one power actuator by virtue of tray 27.

The shape of the hinge member 18 substantially resembles a "goose-neck" or an inverted "question mark." The elongated first portion 22 is substantially straight. The remaining or second portion 28 of the hinge member 18 is curved and is substantially larger than the first portion 22. The second portion 28 rigidly extends from the distal end of the first portion 22 substantially near the secondary pivot axis 26. The second portion 28 has a straight portion 29 at its own opposite distal end that is attached to closure 12 by a plurality of fasteners or bolts (not shown).

Figure 5:
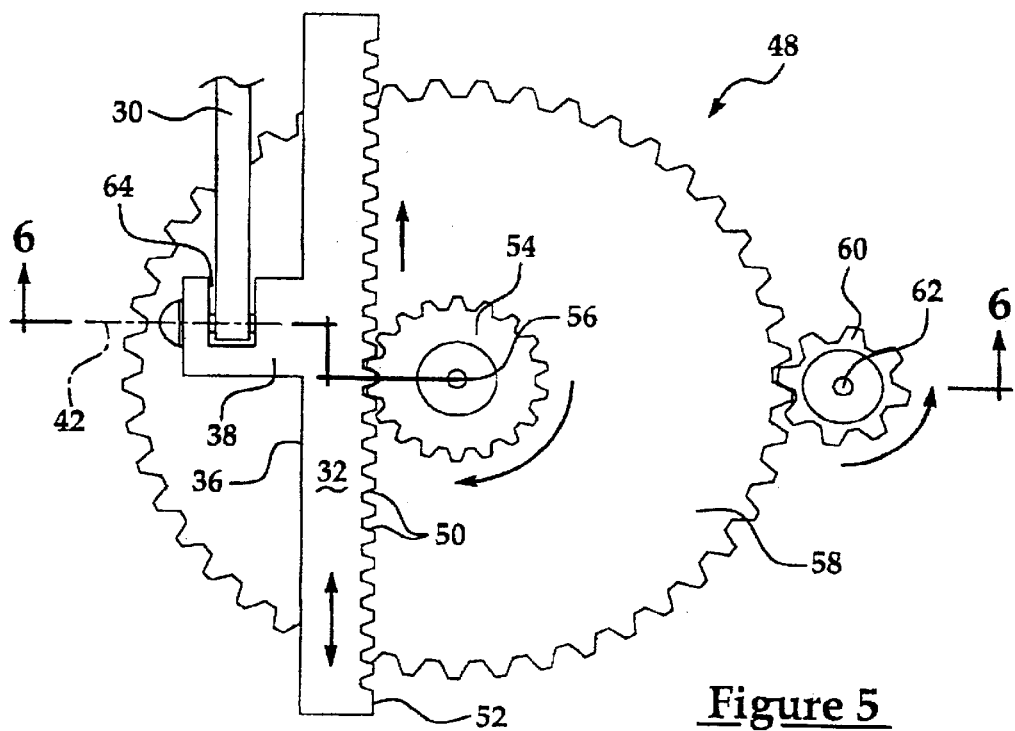
FIG. 5 is an enlarged bottom view of the power actuator with a rack housing and tray removed to show internal detail.

Referring to FIGS. 2–5, engaging pivotally to the secondary pivot axis 26 is a link or armature 30 linking the hinge member 18 to an elongated rack 32, as best shown in FIG. 5. The rack 32 is disposed substantially horizontal, forward of the hinge member 18 in relationship to the vehicle 10 and perpendicular to the hinge axis 24. The rack 32 slides linearly and longitudinally within a housing 34 supported by and disposed beneath the tray 27. The housing 34 has a longitudinally extending slot 40 disposed on a substantially vertical side 35 of the housing 34 and which communicates through a distal end of the housing 34 closest to the hinge member 18. Extending laterally outward from a substantially vertical side 36 of the rack 32 and through the slot 40 is a fin 38. The armature 30 pivotally engages the fin 38 at its opposite end pivoting about a rack pivot pin or axis 42. The rack pivot axis 42 is parallel to the hinge axis 24 of the hinge member 18 which is parallel to the secondary pivot axis 26.

Figure 6:
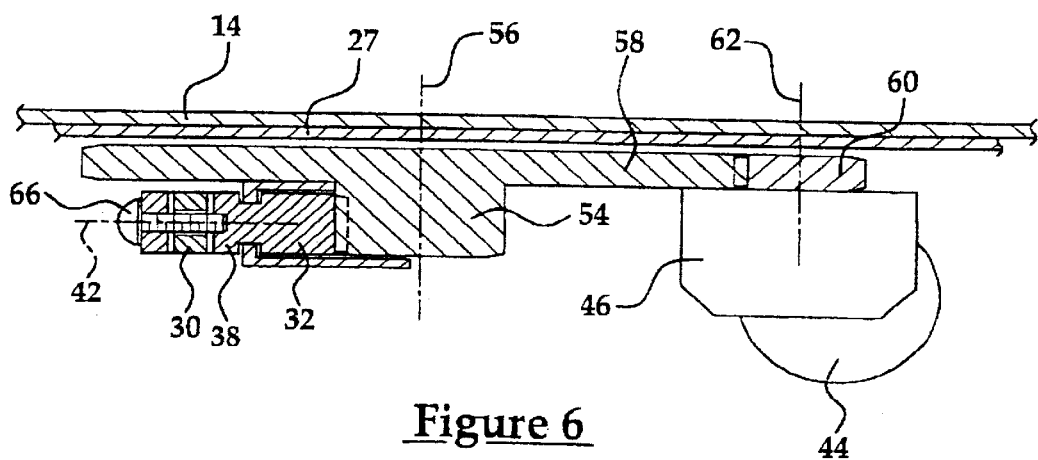
FIG. 6 is a cross section view of the power actuator taken along line 6—6 of FIG. 5 viewing in the direction of the arrows.

Also disposed beneath and engaged to the tray 26 is an electrical motor 44 which mounts and drives or turns a clutch 46 which transmits the torque to a pinion gear train 48. The pinion gear train 48 preferably increases the torque substantially for example by a factor of 5.33:1 and translates the torque to a linear force by engaging vertical extended teeth 50 formed into a side 52 of rack 32 opposite side 36. Referring to FIGS. 5 and 6, the pinion gear train 48 has a pinion gear 54 which rotates about a pinion gear rotational axis 56 engaging the teeth 50 of the rack 32 causing linear movement of the rack 32. The rotational axis 56 is substantially perpendicular to the rack pivot axis 42. Engaged concentrically, and preferably unitarily, to the pinion gear 54 is an intermediate gear 58 of the pinion gear train 48. The intermediate gear 58 is considerably larger than the pinion gear 54 and consequently is disposed laterally between the rack housing 34 and the tray 26 as best shown in FIG. 6. Lying within the same imaginary plane as the intermediate gear 58 is a drive gear 60 having a drive gear rotational axis 62 disposed substantially parallel to the pinion gear rotational axis 56. The drive gear 60 is rotated by the clutch 46 which is driven by the electric motor 44 upon a signal sent by the controller 20. Preferably the gear train 48 increases torque substantially as indicated above. For instance, the drive gear 60 may have nine teeth, the intermediate gear 58 may have forty-eight teeth, and the pinion gear 54 may have eight teeth for driving the rack 32 in a linear direction toward and away from the hinge axis 24.

Referring to FIGS. 5 and 6, the fin 38 of the rack 32 has a channel 64 traversing the rack pivot axis 42. The armature 30 extends pivotally outward from the channel 64. A pin or fastener 66 is centered about the rack pivot axis 42 and traverses the channel 64 through the armature 30. While the rack 32 moves rearward toward the liftgate within the housing 34 to open the closure 12, the fin 38 moves rearward along the slot 40, and the armature 30 pivots downward about axis 42 within the channel 64.

Figure 7:
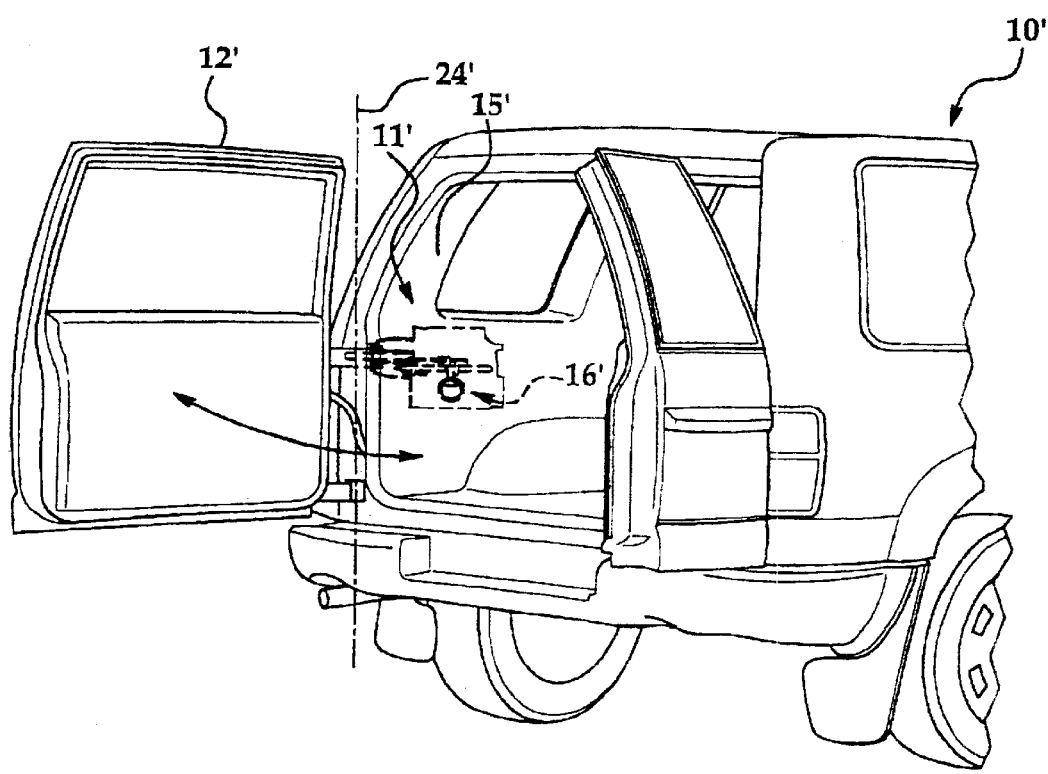
FIG. 7 is a perspective view of a second embodiment of the pivoting closure assembly.

Referring to FIG. 7, a second embodiment of the pivoting closure assembly 11' is shown wherein the closure 12' is a tailgate or door which pivots about a hinge axis 24' that is substantially vertical. The power actuator 16' which is substantially identical to the power actuator 16 described above, is rotated ninety degrees from the orientation of the first embodiment to align with the vertical hinge axis 24'. Preferably, the power actuator 16' is secured to the D-pillar 15' of the vehicle 10'.

Referring to FIGS. 8 and 9, a third embodiment of the pivoting closure assembly 11" is shown. The rack 32" moves linearly and substantially horizontally within the housing 34" like the first embodiment, however, the fin 38 of the first embodiment is not required in the third embodiment. Instead, the armature 30" is engaged pivotally to the leading end of the rack 32" and rides within the same housing 34". Housing 34" has a bell shaped end 70 which generally curves upward and provides the necessary clearance for the armature 30" to angle, or pivot, laterally upward as the rack 32" pushes the armature 30" axially out of the housing 34".

Furthermore, the teeth 50" of the rack 32" are mounted on an adjacent side (relative to the first embodiment), or top side of the rack 32". This orientates the pinion gear rotational axis 56" parallel to the rack pivot axis 42". Mounted rotationally on both the leading and trailing ends of the rack 32" are a pair of wheels 72 which ride on the inner bottom surface of the housing 34" for friction reduction between the housing 34" and the rack 32" . . . hen pivoting closure assembly 11" is installed in a vehicle housing 34" is attached to the vehicle roof so that hinge axis 24" is located interiorly of the cut line shown in FIG. 2. The liftgate is then attached to the distal end of hinge member 18". The vehicle and liftgate are not shown in FIGS. 8 and 9 since such structure are well known and understood.

Although the preferred embodiments have been disclosed, various changes and modifications may be made thereto by one skilled in the art without departing from the scope and spirit of the invention as set forth in the appended claims. For instance, the teeth 50 of the rack 32 may be disposed on the same side 36 as the fin 38. Furthermore, for varying space restrictions within the vehicle 10, the teeth 52 of the rack 32 may be disposed on the upper or lower sides of the rack 32. This positioning would create a ninety degree rotation of the pinion gear train as previously described. It is also understood that the terms used herein are merely descriptive rather than limiting and various changes may be made without departing from the scope and spirit of the invention.

What is claimed is:

1. An automotive pivoting closure assembly comprising:
   a vehicle structure;
   a hinge member having a first portion, a second portion, a hinge axis, and an opposite secondary pivot axis, the first portion engaged pivotally to the vehicle structure about the hinge axis and extended between the hinge axis and secondary pivot axis, the hinge axis remaining stationary to the vehicle structure, the second portion extended rigidly from the first portion at the secondary pivot axis, the hinge axis being parallel to the secondary pivot axis;
   a closure engaged to the second portion of the hinge member;
   an armature engaged pivotally about the secondary pivot axis of the first portion of the hinge member;
   an elongated toothed rack disposed perpendicular to the hinge axis, the rack constructed and arranged to move slideably with respect to the vehicle structure and transversely toward and away from the hinge axis, the rack having a rack pivot axis disposed parallel to the hinge axis of the hinge member, the armature engaged pivotally to the rack pivot axis and extended between the rack pivot axis and the secondary pivot axis of the hinge member;
   a pinion gear train supported by the vehicle structure and constructed and arranged to drive the toothed rack;
   an elongated rack housing engaged to the vehicle structure, the rack disposed slideably within the housing, the housing having a slot extended longitudinally along the rack housing;
   the rack having a fin extended from the rack along the rack pivot axis and through the slot of the rack housing, the armature engaged pivotally to the fin;
   an electric motor arranged and constructed to drive the pinion gear train;
   a clutch engaged between the motor and the pinion gear train,
   the pinion gear train having a pinion gear engaged operatively to the toothed rack, and
   an intermediate gear disposed concentrically and engaged rigidly to the pinion gear.

2. The closure assembly as set forth in claim 1 wherein the pinion gear train has a drive gear engaged rigidly to the clutch and operatively to the intermediate gear.

3. The closure assembly as set forth in claim 2 further comprising a support tray engaged to the vehicle structure, the rack housing engaged rigidly to the tray, the hinge member engaged pivotally to the tray about the hinge axis, and the pinion gear train supported and encased by the tray.

4. The closure assembly as set forth in claim 3 wherein the teeth of the rack are disposed on an opposite side of the rack from the fin and wherein the pinion gear has a rotational axis disposed perpendicular to the rack pivot axis.

5. The closure assembly as set forth in claim 4 wherein the drive gear has a rotational axis parallel to the pinion gear rotational axis.

6. The closure assembly as set forth in claim 5 wherein the fin has a channel and a pin, the pin traversing the channel, disposed concentrically to the rack pivot axis, and extended through a hole in the armature, the armature engaged pivotally about the pin within the channel.

7. The closure assembly as set forth in claim 6 wherein the hinge axis is horizontal, wherein the vehicle structure is a roof, and wherein the closure is a liftgate.

8. The closure assembly as set forth in claim 6 wherein the hinge axis is vertical.

9. An automotive pivoting closure assembly comprising:
   a vehicle structure;
   a hinge member having a first portion, a second portion, a hinge axis, and an opposite secondary pivot axis, the first portion engaged pivotally to the vehicle structure about the hinge axis and extended between the hinge axis and secondary pivot axis, the hinge axis remaining stationary to the vehicle structure, the second portion extended rigidly from the first portion at the secondary pivot axis, the hinge axis being parallel to the secondary pivot axis;
   a closure engaged to the second portion of the hinge member;
   an armature engaged pivotally about the secondary pivot axis of the first portion of the hinge member;
   an elongated toothed rack disposed perpendicular to the hinge axis, the rack constructed and arranged to move slideably with respect to the vehicle structure and transversely toward and away from the hinge axis, the rack having a rack pivot axis disposed parallel to the hinge axis of the hinge member, the armature engaged pivotally to the rack pivot axis and extended between the rack pivot axis and the secondary pivot axis of the hinge member;
   a pinion gear train supported by the vehicle structure and constructed and arranged to drive the toothed rack; and
   an elongated rack housing engaged to the vehicle structure, the rack disposed slideably within the housing, the elongated rack having a planar bell shaped end, the armature constructed and arranged to move longitudinally in and out of the housing through the bell shaped end while pivoting laterally within the imaginary plane of the bell shaped end.

10. The closure assembly as set forth in claim 9 the pinion gear train has a pinion gear having a rotational axis disposed parallel to the rack pivot axis.

11. The closure assembly as set forth in claim 10 wherein the hinge member has a goose-neck shape.

12. The closure assembly as set forth in claim 11 further comprising a pair of rotating wheels mounted on both ends of the elongated rack, the wheels riding on the housing to reduce frictional forces between the housing and the moving rack.

13. An automotive pivoting closure assembly comprising:
a vehicle structure;
a tray engaged to the vehicle structure;
a hinge member having a first portion, a second portion, a hinge axis, and an opposite secondary pivot axis, the first portion engaged pivotally to the tray about the hinge axis and extended between the hinge axis and secondary pivot axis, the hinge axis remaining stationary to the vehicle structure, the second portion extended rigidly from the first portion at the secondary pivot axis, the hinge axis being parallel to the secondary pivot axis;
a closure engaged to the second portion of the hinge member;
an armature engaged pivotally about the secondary pivot axis of the first portion of the hinge member;
an elongated rack housing engaged to the tray;
an elongated toothed rack disposed perpendicular to the hinge axis, the rack constructed and arranged to move slideably within the rack housing and transversely toward and away from the hinge axis, the rack having a rack pivot axis disposed parallel to the hinge axis of the hinge member, the armature engaged pivotally to the rack pivot axis and extended between the rack pivot axis and the secondary pivot axis of the hinge member; and
a pinion gear train supported by the tray and constructed and arranged to drive the toothed rack.

14. The closure assembly as set forth in claim 13 further comprising:
the rack housing having a slot extended longitudinally along the housing;
and;
the rack having a fm extended from the rack along the rack pivot axis and through the slot of the rack housing, the armature engaged pivotally to the fin.

15. The closure assembly as set forth in claim 13 wherein the vehicle structure is a roof and the closure is a liftgate engaged to the second portion of the hinge member.

16. The closure assembly as set forth in claim 15 wherein the shape of the hinge member is an inverted "question mark", and wherein the first portion is straight and the second portion, being larger than the first portion, is curved near the secondary pivot axis.

17. An automotive pivoting closure assembly comprising:
a vehicle structure;
a hinge member having a first portion, a second portion, a hinge axis, and an opposite secondary pivot axis, the first portion engaged pivotally to the vehicle structure about the hinge axis and extended between the hinge axis and secondary pivot axis, the hinge axis remaining stationary to the vehicle structure, the second portion extended rigidly from the first portion at the secondary pivot axis, the hinge axis being parallel to the secondary pivot axis;
a closure engaged to the second portion of the hinge member;
an armature engaged pivotally about the secondary pivot axis of the first portion of the hinge member;
an elongated toothed rack disposed transverse to the hinge axis, the rack constructed and arranged to move slideably with respect to the vehicle structure and transversely toward and away from the hinge axis, the rack having a rack pivot axis disposed parallel to the hinge axis of the hinge member, the armature engaged pivotally to the rack pivot axis and extended between the rack pivot axis and the secondary pivot axis of the hinge member;
a pinion gear train supported by the vehicle structure and constructed and arranged to drive the toothed rack,
an elongated rack housing engaged to the vehicle structure, the rack disposed slideably within the housing, the housing having a slot extended longitudinally along the rack housing;
the rack having a fin extended from the rack along the rack pivot axis and through the slot of the rack housing, the armature engaged pivotally to the fin,
an electric motor arranged and constructed to drive the pinion gear train,
the pinion gear train having a pinion gear engaged operatively to the toothed rack, and
an intermediate gear disposed concentrically and engaged rigidly to the pinion gear.

18. The closure assembly as set forth in claim 17 further comprising a support tray engaged to the vehicle structure, the rack housing engaged rigidly to the tray, the hinge member engaged pivotally to the tray about the hinge axis, and the pinion gear train supported and encased by the tray.

19. The closure assembly as set forth in claim 18 wherein the vehicle structure is a roof and the closure is a liftgate engaged to the second portion of the hinge member.

* * * * *